United States Patent
Chen et al.

(10) Patent No.: US 9,758,667 B2
(45) Date of Patent: *Sep. 12, 2017

(54) ALKALI-SOLUBLE RESIN (ASR) SHELL EPOXY RDP EXHIBITING IMPROVED SHELF STABILITY

(71) Applicants: Dow Global Technologies LLC, Midland, MI (US); Rohm and Haas Company, Philadelphia, PA (US)

(72) Inventors: Liang Chen, Midland, MI (US); Mark D. Westmeyer, Collegeville, PA (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/432,098

(22) PCT Filed: Oct. 1, 2013

(86) PCT No.: PCT/US2013/062833
§ 371 (c)(1),
(2) Date: Mar. 27, 2015

(87) PCT Pub. No.: WO2014/055494
PCT Pub. Date: Apr. 10, 2014

(65) Prior Publication Data
US 2016/0017140 A1    Jan. 21, 2016

Related U.S. Application Data

(60) Provisional application No. 61/709,309, filed on Oct. 3, 2012.

(51) Int. Cl.
*C08L 63/00* (2006.01)
*C08J 3/12* (2006.01)
*C08L 63/10* (2006.01)

(52) U.S. Cl.
CPC ............... *C08L 63/00* (2013.01); *C08J 3/126* (2013.01); *C08L 63/10* (2013.01); *C08L 2205/03* (2013.01); *C08L 2207/53* (2013.01)

(58) Field of Classification Search
CPC ...... C08L 63/00; C08L 63/10; C08L 2205/03; C08L 2207/53; C08J 3/126

USPC ............................................ 524/5, 6; 525/57
See application file for complete search history.

(56) References Cited

U.S. PATENT DOCUMENTS

| | | | |
|---|---|---|---|
| 4,876,313 A | 10/1989 | Lorah | |
| 4,916,171 A | 4/1990 | Brown et al. | |
| 5,252,704 A * | 10/1993 | Bright | C08J 3/122 523/334 |
| 5,739,179 A | 4/1998 | Chiou et al. | |
| 5,942,563 A | 8/1999 | DeGraaf | |
| 5,959,029 A | 9/1999 | Koelliker et al. | |
| 5,981,627 A | 11/1999 | Shih et al. | |
| 6,224,981 B1 | 5/2001 | Richard et al. | |
| 6,433,061 B1 | 8/2002 | Marchant et al. | |
| 6,869,982 B2 | 3/2005 | Dang et al. | |
| 7,744,694 B2 | 6/2010 | Weitzel et al. | |
| 7,803,225 B2 | 9/2010 | Zhang et al. | |
| 2001/0024644 A1 | 9/2001 | Kohlhammer et al. | |
| 2004/0097701 A1 * | 5/2004 | Weitzel | C08F 6/003 528/501 |
| 2010/0197831 A1 | 8/2010 | Faatz et al. | |
| 2011/0160350 A1 | 6/2011 | Bergman et al. | |
| 2012/0077906 A1 | 3/2012 | Herold et al. | |

FOREIGN PATENT DOCUMENTS

| | | |
|---|---|---|
| CN | 1039823 A | 2/1990 |
| CN | 102300940 A | 12/2011 |
| EP | 0348565 A1 | 1/1990 |
| EP | 0522791 A1 | 1/1993 |
| EP | 0654454 A1 | 5/1995 |
| FR | 2943665 A1 | 10/2010 |
| JP | H07166031 A | 6/1995 |
| WO | 2012177448 A1 | 12/2012 |
| WO | 2013134208 A1 | 9/2013 |
| WO | 2014099574 A1 | 6/2014 |

* cited by examiner

*Primary Examiner* — Josephine Chang
(74) *Attorney, Agent, or Firm* — Andrew Merriam

(57) ABSTRACT

The present invention provides shelf stable redispersible multilayer polymer particles (RDPs) comprising a major proportion of epoxy resins, a methacrylic acid or anhydride containing alkali soluble polymer outer layer and a hydrophobic chain transfer agent or a high glass transition temperature colloidal stabilizer, such as poly(vinyl pyrrolidinone) or its copolymer, as well as to methods of making the same.

10 Claims, No Drawings

ALKALI-SOLUBLE RESIN (ASR) SHELL EPOXY RDP EXHIBITING IMPROVED SHELF STABILITY

The present invention relates to multilayer polymer particle redispersible polymer powders (RDP) comprising an epoxy resin layer and an outer layer of an alkali soluble polymer and having excellent shelf stability. More particularly, it relates to multilayer polymer particles comprising a major proportion of epoxy resins, a methacrylic acid containing alkali soluble polymer outer layer and a hydrophobic chain transfer agent or a high glass transition temperature colloidal stabilizer, as well as to methods of making the same.

RDPs prepared from emulsion polymers have been widely used in cement or hydraulic binder construction applications, e.g. cement containing tile adhesives, SLFC (self level flooring compounds) to improve mechanical properties of the cement or binder. In such applications RDPs comprising crosslinkable polymers have been used to improve chemical and stain resistance and reduce water permeation. For example, epoxy resins are used in the repair of concrete and cement mortars to impart toughness, reduced water permeability, rapid setting, and chemical and stain resistance.

Many epoxy-modified cement products are currently available in the market. A liquid epoxy dispersion and hardener may be admixed with the cement(s) as a dry powder in a three-part system; however, complicated use requirements e.g. order of mixing, short pot-life, and equipment contamination have limited use of the products to use only by professional contractors. An RDP epoxy would be easier to use than the three-part system. One possible approach would be to incorporate epoxy functional groups into emulsion polymers, however, this method results only in a low epoxy content; in addition, the epoxy functional addition polymerizable monomers, such as, glycidyl methacrylate (GMA) cost far more than conventional epoxy resins. Thus, at present, there are no epoxy RDP products commercially available.

Recently, an epoxy RDP has been made by methods comprising mechanically dispersing Type 1 or liquid epoxy resin or from epoxy resin blends having a glass transition temperature (Tg) of <40° C., including PVOH as a primary dispersant in combination with a co-dispersant, to prepare aqueous epoxy resin dispersions, followed by using the epoxy dispersion to seed emulsion polymerization of acrylic monomers to introduce a high Tg acrylic shell onto the epoxy particles. Finally, the resultant dispersion was spray dried into epoxy powders that show 100% redispersibility in aqueous alkali (NaOH). The resulting epoxy resin can be cured at high pH condition without amine hardener because the acrylic shell can be dissolved to trigger the curing reaction of epoxy resin in an alkaline environment. Nevertheless, in most end use applications, a 3 to 6 month shelf stability is critical. However, the prior epoxy RDP may lack sufficient shelf stability to enable utility to the end user.

The present inventors have sought to solve the problem of achieving full redispersibility of an epoxy RDP powder in a cement environment.

STATEMENT OF THE INVENTION

1. In accordance with the present invention, redispersible polymer powders comprise multilayer polymer particles of from 50 to 90 wt. %, preferably, from 60 to 85 wt. %, based on total polymer solids, of epoxy resin compositions, preferably a blend of two epoxy resins, having a calculated glass transition temperature (Tg) of from 0 to 40° C., preferably from 5 to 35° C., or, more preferably, from 10 to 35° C., and from 10 to 50 wt. %, or, preferably, 25 to 50 wt. % based on epoxy solids, of an alkali soluble polymer shell around the epoxy resin, which polymer shell is the copolymerized product of from 10 to 50 wt. %, or, preferably, from 20 to 50 wt. % of methacrylic acid or its anhydride, based on total weight of monomers copolymerized to form the alkali soluble polymer shell, and the remainder of one or more ethylenically unsaturated comonomer and one or more chain transfer agent, wherein in the redispersible polymer powder, (i) the alkali soluble polymer shell comprises in copolymerized form from 0.1 to 10 wt. %, or, preferably, from 1 to 5 wt. % total, based on the total weight of ethylenically unsaturated monomers copolymerized to form the polymer shell, of one or more hydrophobic chain transfer agent, such as, for example, n-dodecyl mercaptan, (ii) the redispersible polymer powder comprises from 3 to 25 wt. %, based on the total weight of epoxy resin, alkali soluble polymer and colloidal stabilizer solids, or, preferably, from 5 wt. % to 15 wt. % of one or a mixture of colloidal stabilizers having a Tg of 90° C. or more, or, more preferably, 120° C. or more, or, more preferably 140° C. (iii) or both (i) and (ii).

2. Preferably, in item 1, above, the colloidal stabilizer is chosen from polyvinyl alcohol or poly(vinyl pyrrolidone) (poly(vinyl pyrrolidinone)) or a copolymer thereof, or a mixture thereof; more preferably, the colloidal stabilizer is a poly(vinyl pyrrolidone) (poly(vinyl pyrrolidinone)) or its copolymer.

3. Preferably, in any of items 1 or 2, above, the alkali soluble polymer that comprises the polymer shell of the multilayer polymer particle has a calculated Tg of 60° C. or higher, preferably from 80° C. to 120° C.

4. Preferably, the alkali soluble polymer of the multilayer polymer in any of items 1, 2 or 3 has a weight average molecular weight of from 5 to 500 kg/mol, preferably, from 5 to 50 kg/mol.

5. The present invention further comprises compositions comprising cement or hydraulic binder and the redispersible polymer powder composition as claimed in any one of items 1 to 4, above.

6. In another aspect, the present invention comprises methods for making the water dispersible epoxy multilayer polymer powders of any of items 1, 2, 3, 4, or 5 above, comprising, mechanically dispersing an epoxy resin in an aqueous medium to form an initial aqueous epoxy resin dispersion; charging the initial aqueous epoxy resin dispersion into a reaction vessel; providing in the reaction vessel an ethylenically unsaturated monomer mixture, such as a monomer emulsion, comprising (i) from 10 to 50 wt. %, or, preferably, from 20 to 50 wt. % of methacrylic acid or its anhydride, based on total weight of ethylenically unsaturated monomers copolymerized to form the polymer shell, and (ii) the remainder of one or more copolymerizable ethylenically unsaturated monomers (iii) from 0 to 10 wt. %, based on the total weight of ethylenically unsaturated monomers copolymerized to form the polymer shell, or, preferably, from 1 to 5 wt. % of one or more chain transfer agent, and one or more addition polymerization catalyst, such as, for example, a free radical initiator or redox catalyst, and copolymerizing the monomer mixture in the presence of the initial aqueous epoxy resin dispersion to form an aqueous multilayer polymer particle dispersion; adding one or more colloidal stabilizer to the aqueous multilayer polymer particle dispersion; and removing the aqueous phase from the resulting multilayer polymer to obtain a water redispersible epoxy polymer powder having an alkali soluble polymer shell, wherein the one or more colloidal stabilizer is added to the epoxy resin or dispersion at any one or more point before removing the aqueous phase, further wherein, the amounts of epoxy resin, unsaturated monomers colloidal stabilizer are selected so that the resulting water redispersible epoxy multilayer polymer powder has from 50 to 90 wt. %, preferably 60-85 wt. % of epoxy resin and from 10 to 50 wt. %, preferably from 25 to 50 wt. % of alkali soluble polymer, based on epoxy solids, and, still, further wherein, the multilayer polymer particle powders comprise (i) one or a mixture of colloidal stabilizers having a Tg of 90° C. or more, or, more preferably, 120° C. or more, or, even more preferably, 140° C. or more, (ii) from 0.1 to 10 wt. %, based on the total weight of ethylenically unsaturated monomers copolymerized to form the polymer shell, or, preferably, from 1 to 5 wt. % of a hydrophobic chain transfer agent in copolymerized form, or both (i) and (ii). Preferably, the composition comprises a total of from 3 to 25 wt. %, more preferably from 5 to 15 wt. % of a colloidal stabilizer, based on total epoxy resin solids.

7. In the process of item 6, above, preferably, the unsaturated monomer mixture is selected so that the resulting alkali soluble polymer has a calculated glass transition temperature (calculated Tg) of 60° C. or higher, preferably, from 80° C. to 120° C.

8. In the process of item 6, above, preferably, the ethylenically unsaturated monomer mixture is added by gradual addition to the reaction vessel containing the initial aqueous epoxy resin dispersion; however, some or all of the monomer mixture can be combined with the aqueous medium comprising epoxy resin or with the initial aqueous epoxy resin dispersion at any time prior to or during copolymerizing.

Unless otherwise indicated, all temperature and pressure units are room temperature and standard pressure (STP). All ranges recited are inclusive and combinable.

All phrases comprising parentheses denote either or both of the included parenthetical matter and its absence. For example, the phrase "filler(s)" includes, in the alternative, one filler and two or more fillers.

As used herein, the term "aqueous" means water or a mixture of water and up to 50 wt. %, preferably, up to 10 wt. %, or, more preferably, 5 wt. % or less of water miscible solvent(s), based on the total weight of water and the one or more solvent.

The particle size distribution was measured using a Coulter™ LS 13-320 laser diffraction particle size analyzer (Beckman Coulter, Brea, Calif.) per manufacturer's recommended procedures via laser scattering. The scattering light from particles through laser scattering and polarization intensity differential scattering is collected as a function of angle, and subsequently converted to a particle size distribution. The phrase "average particle size" means volume-average particle size as determined by laser diffraction according to ISO 13320-2009 using a Coulter Counter particle size and count analyzers.

As used herein, unless otherwise indicated, the term "based on polymer solids" means the epoxy resin composition and the alkali soluble polymer when referring to the multilayer polymer particle.

As used herein, the term "calculated Tg" refers to the glass transition temperature of a (co)polymer as determined by the Fox equation, using temperature values in degrees Kelvin:

$$1/Tg_{copolymer} = \Sigma(wf_i/Tg_i)$$

where $Tg_{copolymer}$ is the Tg of the copolymer, $wf_i$ is the weight-fraction of monomer "i" in the (co)polymer and $Tg_i$ is the glass transition temperature of a homopolymer made from monomer "i" and the summation is over all monomers "i".

As used herein, the term "epoxy glass transition temperature (Tg)" or "epoxy resin calculated glass transition temperature (calculated Tg)" for a blend of epoxy resins is determined by the epoxy composition, and is predicted by the Fox equation where "w" is the wt. % of solid epoxy resin in the blend (Tg is calculated in degrees Kelvin):

$$1/Tg = w/Tg_{solid} + (1-w)/Tg_{liquid}.$$

As used herein the term "emulsion" and the term "dispersion" mean the same thing and can be used interchangeably.

As used herein, unless otherwise indicated, the phrase "glass transition temperature" or "Tg" refers to a calculated Tg.

As used herein, the concept of a "glass transition temperature (Tg) of a mixture of colloidal stabilizers" is a weighted average of each colloidal stabilizer in the mixture; thus, for example, a mixture of 50 wt. %, the weights based on the total weight of colloidal stabilizers, of a colloidal stabilizer having a Tg of 80° C. and 50 wt. % of a colloidal stabilizer having a Tg of 160° C. would give a mixture of colloidal stabilizers having a Tg of 120° C.

As used herein, unless otherwise indicated, the phrase "molecular weight" refers to the weight average molecular weight as measured by gel permeation chromatography (GPC) against poly(styrene) standards.

As used herein, the term "multilayer polymer particle" refers to polymer particles having two or more layers associated with one another including by chemical grafting, encapsulation, and physical adsorption (physiadsorption).

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer. Thus, the term "polymer" includes copolymers and polymers within its scope.

As used herein the term "total RDP weight" refers to polymer, colloidal stabilizer, and any additive solids in the RDP powder.

As used herein, the term "wt. %" stands for weight percent.

The present invention enables improved shelf life for epoxy powder particles for use in cement. The epoxy resin in the multilayer polymer particle of the present invention is present at a very high concentration of 50 wt. % or higher, preferably, 65 wt. % or greater, still more preferably, 75 wt. % or greater and can be present at a concentration of 85 wt. % or greater and up to 90 wt. % or less based on total epoxy RDP particle weight. Shelf stability for such epoxy powder compositions is not expected where the glass transition temperature (Tg) of the epoxy resin ranges from 0 to 40° C. Lower Tg epoxy resins are desirable because they diffuse more quickly as a binder and because they are film forming even room temperature or below. However, lower Tg epoxy resins, especially those in liquid form in processing conditions, tend to diffuse more easily between RDP particles and can cause irreversible agglomeration of the particles which precludes the shelf stability of the epoxy powder; this is especially difficult where there is a high concentration of epoxy resin in epoxy RDPs, such as the multilayer polymer RDP particles of the present invention. The shelf life of epoxy resin RDPs of the present invention is surprisingly enabled by inclusion of a hydrophobic chain transfer agent in the epoxy seeded multilayer polymer particle polymerization or including one or more high Tg colloidal stabilizers, such as PVP (Tg=168° C.), or, preferably, both. The shelf life of the redispersible polymer powder of the present invention can be extended to greater than 3 months shelf life in the case of a low Tg or liquid epoxy resin, even greater than 6 months. Preferably, blends of solid and liquid epoxy resins can be used to fine tune the glass transition temperature of the epoxy to the desired or preferred range, thereby maximizing film formation, storage stability and redispersibility.

Suitable epoxy resins for use in the present invention include aliphatic, araliphatic and aromatic epoxy compounds which are polyglycidyl ethers of a polyol, such as a hydroxyl-functional oligomer. Such epoxy resins have at least 2 glycidyl groups and are the reaction products of a polyol, such as a glycol, or a hydroxyl-functional oligomer, with an epihalohydrin, such as epichlorohydrin. Such preparations are well known in the art (see for example U.S. Pat. No. 5,118,729, columns 4-7 and "Epoxy resins" by Pham, H. Q. and Marks, M. J. in Ullmann's Encyclopedia of Industrial Chemistry, Wiley-VCH Verlag, Weinheim, 2005).

Examples of suitable polyols include polyhydric phenols and polyhydric alcohols. Specific non-limiting examples of monomeric polyols are resorcinol, catechol, hydroquinone, bisphenol, bisphenol A, bisphenol AP (1,1-bis(4-hydroxylphenyl)-1-phenyl ethane), bisphenol F, bisphenol K, tetrabromobisphenol A, tetra-methylbiphenol, tetramethyl-tetrabromobiphenol, tetramethyl tribromobiphenol, tetrachlorobisphenol A, 4,4'-sulfonyldiphenol, 4,4-oxydiphenol, 4,4'-dihydroxybenzophenone, 9,9'-bis(4-hydroxyphenyl)fluorine, 4,4'-dihydroxybiphenyl, and 4,4'-dihydroxy-α-methylstilbene. Examples of hydroxyl-functional oligomers include phenol-formaldehyde novolak resins, alkyl substituted phenol-formaldehyde resins, phenol-hydroxybenzaldehyde resins, cresol-hydroxybenzaldehyde resins, dicyclopentadiene-phenol resins, and dicyclopentadiene-substituted phenol resins. Suitable polyols for making the epoxy resin can be substituted, if desired, with one or more non-interfering substituents, such as halogen atoms, ether radicals, lower alkyls and the like. An oligomeric or polymeric compound such as a phenol-formaldehyde novolac may be used as the polyhydroxy compound.

Preferably, the polyol used to prepare the epoxy resin is an aromatic dihydroxy compound, such as bisphenol A and/or bisphenol F.

Preferred examples of epoxy resins for use in the present invention include the diglycidyl ether of bisphenol A, such as the be condensates of bisphenol A and epichlorohydrin or methylepichlorohydrin; the diglycidyl ether of bisphenol F that generally contain the condensates of a mixture of bisglycidyloxyphenylmethanes ("Bisphenol F-type resins"); a mixed diglycidyl ether of bisphenol A and F; the diglycidyl ether of a phenol-formaldehyde novolak; and modified epoxy resins such as epoxy resins, e.g. bisphenol A based epoxy resins, modified with an epoxy functional surfactants, such as, for example, epoxy functional nonionic or epoxy functional anionic surfactant, and/or poly(alkylene glycol) epoxide, typically poly(propylene glycol) epoxide or poly(ethylene glycol) epoxide. The epoxy resin can be and desirably is free of sulfur.

One suitable epoxy resin is a linear, non-cross-linked polymer of bisphenol A and epichlorohydrin having terminal epoxide groups. A specific example of a suitable epoxy resin which may be employed herein is D.E.R. 664U, a solid epoxy resin of medium molecular weight, which is the solid reaction product of epichlorohydrin and bisphenol A, having a softening point of 100° C. to 110° C. (The Dow Chemical Company, Midland, Mich.).

In accordance with the methods of the present invention, mechanically dispersing epoxy resin into an aqueous medium to form the initial epoxy resin dispersion may comprise providing the epoxy resin in a softened state, such as, for example, by heating it to a temperature higher than its Tg, if needed, and combining it with an aqueous phase under shear. The shear serves to break the epoxy resin into particles as it disperses those particles into the aqueous phase. Such methods are taught, for example, in U.S. Pat. No. 4,123,403.

In mechanical dispersion processes, an aqueous phase and an organic phase are combined with shearing, such as by feeding them through a high shear mixer that disperses one phase into the other. This may form a high internal phase emulsion. High internal phase emulsions generally have a greater than 74 volume % internal phase dispersed within a continuous phase where volume percent is relative to the total emulsion volume. In such methods, the epoxy resin and aqueous phase can be fed into a high shear mixer to produce a dispersion. If a high internal phase dispersion of epoxy resin in aqueous phase is produced, it can be diluted down with additional aqueous phase if desired to, for example, reduce viscosity of the dispersion. A particularly desirable benefit of mechanical dispersion is that it can produce dispersions with dispersed particles having a highly uniform particle size (narrow particle size distribution) that can be two μm or less, or, preferably, one μm or less. The epoxy resin particles in the initial epoxy resin dispersion desirably have a particle size of 5 μm or less, preferably, 2 μm or less, or, more preferably 1 μm or less, or, yet more preferably 750 nm or less. Generally, smaller particles require higher shear to form.

Suitable shearing methods include extrusion and melt kneading in a known manner including, for example, in a kneader, a Banbury mixer, single-screw extruder, or a multi-screw extruder. A preferred melt-kneading machine is, for example, a multi screw extruder having two or more screws, to which a kneading block can be added at any position of the screws. If desired, an extruder may be provided with a first material-supplying inlet, such as for the epoxy resin, a second material-supplying inlet, such as for and any dispersant, and, further, if desired, third and forth material-supplying inlets in this order from the upstream to the downstream along the flow direction of a material to be kneaded. Further, a vacuum vent may be added.

Preferred shearing devices include a multi screw extruder having two or more screws for continuous processing, and rotor stator mixer and pressurized high shear device for batch processing.

Mechanically dispersing the epoxy resin into the aqueous phase can comprise a batch, semi-continuous or continuous process. Batch processes include preparing the epoxy resin dispersion in a single container by adding the aqueous phase and epoxy resin together while mixing. It is common to add the epoxy resin to the aqueous phase while mixing, however both the aqueous phase and epoxy resin can be added together to the vessel while mixing or the epoxy resin can be added first and the aqueous phase added while mixing. It is also possible to add the epoxy resin and aqueous phase together without mixing and, once the two components have been combined, then mix them together to form a dispersion.

Preferably, a continuous shearing method comprises mixing both aqueous phase and epoxy resin in a continuous stream to produce the initial epoxy resin dispersion, such as in a multi-screw extruder.

Suitable epoxy resins having a Tg of 40° C. or lower, especially those with a Tg of 35° C. or lower, 30° C. or lower are more readily softened for forming the initial epoxy resin dispersion without requiring further heating or softening of any other kind. This avoids the cost and complexity of applying heat to soften the epoxy resin. Preferably, to enable fine tuning of their Tg, such epoxy resins can be blends of low and higher molecular weight epoxy resins as well as epoxy resins that are liquid at ambient temperature. The aqueous phase is preferably water.

In the initial aqueous epoxy resin dispersion, the epoxy resin can contain plasticizers to help them flow, for example, fugitive plasticizer, non-fugitive plasticizer, a combination of fugitive and non-fugitive plasticizer. Preferably, the epoxy resin is free of plasticizer.

Preferably, the initial epoxy resin dispersion is formed in the absence of any organic solvent which means that it contains less than 1000 ppm, or preferably, less than 500 ppm of such a solvent. Organic solvents exclude fugitive plasticizers and monomers.

Preferably, a dispersing agent may be used to prepare the initial epoxy resin dispersion. The dispersing agent can be added to the epoxy resin or directly to the aqueous phase prior to dispersing the epoxy resin, or added to the initial epoxy dispersion as the epoxy resin and aqueous phase are being mixed. Suitable dispersing agents for stabilizing the initial epoxy resin dispersion include any colloidal stabilizers taught above with regard to the epoxy RDP, such as, for example, polyvinyl alcohol (PVOH). Suitable amounts of dispersing agent in the initial epoxy resin dispersion are 15 wt. % or less, preferably, from 4 to 10 wt. % based on total epoxy resin weight.

The alkali soluble polymer shell around the epoxy resin in the multilayer polymer particle RDP of the present invention may prevent the epoxy resin from diffusing from one particle to another, thereby precluding irreversible agglomeration of particles. As the shell is located around the particle rather than blended with the epoxy resin in the particle, the multilayer polymer particles can contain a low concentration of shell (and, hence, much higher concentration of epoxy resin). The alkali soluble polymer shell also releases the epoxy when the epoxy is desired for use as a binder in a cementitious (or other alkaline) formulation because the alkali soluble shell dissolves upon dispersing the RDP particles of the present invention into an aqueous alkali composition.

The monomers used to make the alkali soluble polymer are selected so as to form an alkali soluble polymer shell having a calculated glass transition temperature (Tg) of 60° C. or higher, preferably 75° C. or higher, still more preferably 90° C. or higher, even more preferably 100° C. or higher, or up to 120° C. It is desirable for the alkali soluble polymer shell to have a higher Tg to resist irreversible agglomeration of particles during isolation of the epoxy RDP particles, particularly in the presence of components such as dispersing agents that might plasticize the alkali soluble polymer shell.

The alkali soluble polymer shell comprises the copolymerization product of 5 or more wt. % and up to 50 wt. %, preferably 10 wt. % or more, or, more preferably, 15 wt. % or more, and yet more preferably, 20 wt. % or more of monomers selected from methacrylic acid and anhydride monomers, based on the total weight of monomers polymerized to form the alkali soluble polymer shell, with the remainder one or more copolymerizable ethylenically unsaturated monomers. As concentrations of carboxylic acid or anhydride monomer range further below about 50 wt. %, the alkali soluble polymer will comprise the reaction product of some hydrophilic monomoner(s) to insure that the polymer is alkali soluble.

Suitable hydrophilic monomers, where needed, may comprise hydroxyalkyl esters of a carboxylic acid or (meth) acrylamide. Useful amounts of such hydrophilic monomers may range from zero to 30 wt. % based on the total weight of monomers polymerized to form the alkali soluble polymer shell, or, preferably from 5 to 20 wt. %.

The remaining copolymerizable ethylenically unsaturated monomers used to form the alkali soluble polymer shell are desirably chosen from alkyl methacrylates, such as, for example, 2-ethylhexyl methacrylate, methyl methacrylate, ethyl methacrylate, butyl methacrylate, and fatty alkyl methacrylates, such as lauryl methacrylate. Such monomers may comprise 30 to 95 wt. % of monomers, based on the total weight of monomers polymerized to form the alkali soluble polymer shell.

The copolymerizable ethylenically unsaturated monomers can further comprise up to 25 wt. %, preferably up to 10 wt. %, based on the total weight of monomers used to make the copolymer, of one or more other nonionic monomers, such as vinyl aromatic monomers like styrene or alkyl substituted styrene; and alkyl acrylates may be copolymerized in to the alkali soluble polymer.

Preferably, the nonionic monomers comprise hard hydrophobic monomers, such as vinyl aromatic to improve the shell stability.

Preferably, all of the ethylenically unsaturated monomer mixture can be combined with the already formed initial aqueous epoxy resin dispersion before or during their polymerization. Most preferably, all of the ethylenically unsaturated monomer mixture is added by gradual addition, e.g. metering it, into the reaction vessel containing the initial aqueous epoxy resin dispersion. Such monomers, including the carboxylic acid or anhydride monomers may be added during or prior to addition of an addition polymerization catalyst, preferably in a separate feed.

Suitable chain transfer agents for use in the polymerization methods of the present invention may include any mercaptans. The preferred hydrophobic chain transfer agents or making the redispersible polymer powders of the present invention may be $C_6$ to $C_{18}$ alkyl, cycloalkyl or alkylaryl group containing thiols or mercaptans, or, preferably, $C_8$ or higher alkyl, cycloalkyl or alkylaryl group containing thiols or mercaptans, such as, for example, n-dodecyl mercaptan a fatty thiol. More preferably, such $C_8$ or higher alkyl, cycloalkyl or alkylaryl group containing chain transfer agents having a single sulfur atom.

In the methods of the present invention, the chain transfer agent can be mixed into a monomer emulsion or can be separately added into the epoxy dispersion and the monomer emulsion is fed separately. The chain transfer agents can be charged or metered by gradual addition, preferably, added in one shot.

The ethylenically unsaturated monomer mixture of the alkali soluble polymer shell of the present invention is polymerized by conventional emulsion polymerization. Addition polymerization catalysts are fed into the reaction vessel before, during or after addition of the unsaturated monomers, with stirring and, optionally, with heating. Suitable catalysts include thermal and/or redox triggered free radical initiators, preferably that are water soluble.

Examples of suitable thermally triggered initiators include peracid salts, such as alkali metal persulfate salts, such as, for example, sodium persulfate; or ammonium persulfate. Suitable redox initiators include combinations of oxidizing agents (such as persulfate salt and organic peroxides) and reducing agents (such as sodium formaldehyde sulfoxylate) and a redox catalyst such an iron (II) sulfate.

The conditions that result in free radical polymerization to make the alkali soluble polymer shell depend on the type of free radical initiator added and are known to the ordinary skilled artisan. Depending on the initiation temperature of the initiator and the ambient temperature of the mixture, thermally triggered initiators may require heating the monomer mixture. The amount of free radical initiator is generally 0.01 wt. % or more, preferably 0.1 wt. % or more while at the same time is generally 2 wt. % or less, based on the total weight of ethylenically unsaturated monomers used to make the alkali soluble polymer shell.

The total polymerization time may range from 1 to 6 hours, preferably up to 4 hours and may include one monomer feed, or two or more monomer feeds which can be sequential feeds, overlapping in time or simultaneous to one another.

The resulting dispersion comprising multilayer polymer particles having an alkali soluble polymer shell is a dispersion of the present invention.

The weight-average molecular weight of the alkali soluble polymer shell may range from 2,500 grams per mole (g/mol) to 500,000 g/mol or less, or 250,000 g/mol or less, or, preferably, 5,000 g/mol or more, or, preferably, 50,000 g/mol or less. An excessively high molecular weight can causes a viscosity buildup at and alkaline pH, thereby leading to handling problems.

Preferably, the alkali soluble polymer shell comprises copolymers of methacrylic acid and methyl methacrylate. In such a copolymer, the concentration of copolymerized methacrylic acid 10 wt. % or more, preferably 15 wt. % or more preferably 20 wt. % or more while at the same time desirably being 50 wt. % or less. The balance of the copolymer is copolymerized methyl methacrylate.

The alkali soluble shell is primarily located around the surface of the epoxy RDP particles and as such efficiently protects the epoxy resin within the particles. As such, the concentration of alkali soluble shell can be equal to or less than the concentration of epoxy resin and still preclude irreversible agglomeration of the epoxy RDP particles. The concentration of the alkali soluble shell may range less than 50 wt. %, and at the same time should range 10 wt. % or more, or, preferably, 15 wt. % or more, or, still more preferably 20 wt. % or more relative to the total weight of the epoxy resins in the multilayer polymer particle RDP.

Removing the aqueous phase and isolate the resulting RDP particles can be done any number of ways including freeze drying or spray drying (atomization), or a combination of both, preferably by spray drying. Such removing of the aqueous phase is conventional in the art and is as described, for example, in US 20110160350A1 by Bergman et al.

Preferably, drying the aqueous admixture comprises spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 140° C. to 170° C. The outlet temperature may generally be from 30° C. to 100° C., preferably from 50° C. to 80° C., depending on the plant, the Tg of the resin and the desired degree of drying. In one example, the viscosity of the feed to be spray-dried may be adjusted via the solids content so that a value of less than 1000 mPas (Brookfield viscosity at 20 rpm and 23° C.), preferably less than 250 mPas, is obtained. The solids content of the admixture to be spray-dried may generally be from 25% to 60% by weight, preferably from 35% to 50% by weight, based on the total weight of the dispersion.

To help prevent irreversible agglomeration of the epoxy resin particles it is common to introduce an anti-caking agent to the epoxy resin particles during the spray drying step. Anti-caking agent can be added in any manner including mixing in with the dispersion prior to spray drying or mixing with the dispersion while spray drying by, for example, blowing into to a chamber with the dispersion.

A colloidal stabilizer or a dispersing agent can be added while feeding and polymerizing the ethylenically unsaturated monomer mixture, while removing the aqueous phase from the multilayer polymer particle RDP particles, or both. Colloidal stabilizer added when spray drying should facilitate redispersion of the RDP particles when the RDP particles are added to an aqueous medium. It is particularly desirable to add a colloidal stabilizer to the RDP particles during the spray drying process.

A colloidal stabilizer is present in the RDP of the present invention and may include one or more of cellulosic thickeners, such as hydroxypropyl cellulose, or hydroxyethyl methyl cellulose; polymers of methyl vinyl ether, water soluble copolymers of ethylenically unsaturated carboxylic acids, such as (meth)acrylic acid or its salts, or preferably a poly(vinyl pyrrolidinone), including its copolymers, a polyvinyl alcohol (PVOH), a partially hydrolyzed PVOH, or any mixture of colloidal stabilizers containing at least 25 wt. % of poly(vinyl pyrrolidinone), based on the total weight of colloidal stabilizers.

Surfactants can be useful as an additive in the RDP of the present invention to facilitate redispersing of the epoxy particles in an aqueous solution. Suitable surfactants, such as, for example, anionic, cationic and/or nonionic surfactants may be used in place of at least part of a colloidal stabilizer. Surfactants containing ethylene oxide groups range in amounts of less than 5 wt. %, based on the total weight of colloidal stabilizer plus surfactant because such surfactants can interfere with the protective nature of the alkali soluble shell.

Suitable amounts of the colloidal stabilizer may range 2 wt. % or more, or, preferably, 5 wt. % or more, or, still more preferably, 7 wt. % or more, and can be present at a concentration of 10 wt. % or more, or up to 25 wt. % or less, or, preferably 20 wt. % or less, or, more preferably, 15 wt. % or less based on the total RDP polymer weight including the colloidal stabilizer, and any other additives. Preferably, the desired concentration of colloidal stabilizers added during the spray drying process may range from 5 to 15 wt. % relative to total epoxy resin and alkali soluble polymer solids.

The epoxy RDP of the present invention desirably includes one or more anti-caking agent to improve powder flowability. Anti-caking agents may be used when spray drying the polymer aqueous dispersion to isolate the multilayer polymer particles. Accordingly, the anti-caking agent can be added in any manner including mixing in with the dispersion prior to spray drying or mixing with the dispersion while spray drying by, for example, blowing into to a chamber with the dispersion. Suitable anti-caking agents include mineral filler such as calcium carbonate, kaolin, barium sulphate, titanium oxide, talc, hydrated alumina, bentonite, calcium sulphoaluminate and silica.

Suitable amounts of anti-caking agent in the range 50 wt. % or less, or, preferably 20 wt. % or less, or, more preferably 15 wt. % or less, or, still more preferably 10 wt. % or less, or, even more preferably 5 wt. % or less relative to total RDP weight including colloidal stabilizer and additive solids. The RDP can be free of anti-caking agent, but generally contains 0.5 wt. % or more, or, preferably 2 wt. % or more, or, more preferably 5 wt. % or more relative to total RDP weight.

Divalent metal ions ($M^{2+}$) having a pKa (in water) of 9.55 or more and up to 30, preferably, 9.59 or more, preferably Zn, Ba, Mg or Ca, or their strong acid (acid pKa≤3.5) or organic acid salt, e.g. acetates, succinates and citrates, preferably, a strong acid salt having a pH in water at a concentration of 1 wt. % of 7.0 or less, such as chlorides, sulfates or phosphates, e.g. $CaCl_2$, may be used as additives to aid in the redispersibility of the RDPs. In suitable amounts, the molar ratio of $M^{2+}$ ions to the carboxyl acid groups in the alkali soluble polymer shell is from 10 to 200 mole %, preferably, from 25 to 100 mole %.

The multilayer polymer particle water redispersible powder (RDP) of the present invention can be dispersed in an aqueous medium to form a dispersion of fine particles, which is also a dispersion of the present invention. For dispersing the RDP of the present invention into an aqueous medium (preferably water), the pH of the dispersion formed may fall in a pH range of 9-13 where the base comprises a cationic species, such as ammonia or NaOH or a base. Cement provides sufficient alkalinity for redispersion of the RDP of the present invention.

The multilayer polymer particle RDP of the present invention is particularly useful for formulating with cementitious components to form epoxy modified cement. The RDP can be dry blended with cement to make a dry mix to which water can be added in use.

Dispersions of multilayer polymer particles that fall within the scope of the present invention include the dispersion of multilayer polymer particles comprising an alkali soluble shell prior to removing the aqueous phase that is formed during the method of the present invention.

EXAMPLES

The present invention will be illustrated below by the following non-limiting examples.

Example 1: Batch Dispersion

To a stainless steel (300 mL) PARR pressure reactor having a 6.67 cm inside diameter, a Cowles blade stirrer, and equipped with an optional pulley system to allow a mixer speed of up to 1830 rpm was charged 70.0 g of D.E.R. 661 (1-type solid bisphenol-A epoxy resin, Mw=1500 g/mol, epoxy equivalent weight=500-560) or epoxy resin blend of D.E.R. 331 (liquid bisphenol-A epoxy resin, Mw=380 g/mol, EEW=182-192, Dow Chemical, Midland, Mich.) and D.E.R. 669E (9-type solid bisphenol-A epoxy resin, Mw=15000 g/mol, EEW=2500-4000). 25.0 g of MOWIOL 4-88 aqueous solution (Polyvinyl alcohol, 88% hydrolyzed, solid content=28.0 wt. %, Kuraray Europe GmbH,). The Tgs of epoxy resin or blend are shown in Table 1, below. The stirrer assembly was inserted into the vessel and turned by hand until it spun freely. The Parr reactor assembly was then loaded onto its ring stand and water hoses were attached to the stirrer's cooling sleeve. The thermocouples and stirrer motor were connected, and the heating mantle was lifted into place and tightened. The reactor was sealed and heated to 100° C., and after reaching the temperature the mixture was stirred for 10 minutes to allow sufficient mixing of the epoxy resin and PVOH solution together at ~1830 rpm. To this mixture water was added using a HPLC pump at the rate of 1.4 ml/min for 20 min. The water addition rate was increased to 14 mL/min for 4 min while the heating mantle was removed and the Parr reactor was cooled by air and water. The reactor was cooled down to 50° C. in water bath while stirring. The resultant dispersion was collected by filtration through a 190 μm filter and had a 40-45% solids content.

Example 2: Continuous Extrusion Dispersion Process

The Epoxy Dispersions were prepared using a KWP (KRUPP WERNER & PFLEIDERER Ramsey, N.J.) ZSK25 extruder (60 L/D rotating at 450 rpm) according to the following procedure with the formulation components shown in Table 1, below. The solid epoxy resin (D.E.R. 669E (9-type solid bisphenol-A epoxy resin, Mw=15000 g/mol, EEW=2500-4000) or D.E.R. 667E (7-type solid bisphenol-A epoxy resin, Mw=10000 g/mol, EEW=1600-1950) and the semi-crystalline MOWIOL 488 (Polyvinyl alcohol, 88% hydrolyzed, Kuraray Europe GmbH)) were supplied to the feed throat of the extruder via a Schenck Mechatron loss-in-weight feeder and then melted blended in extruder, and a liquid epoxy stream (D.E.R. 331, liquid bisphenol-A epoxy resin, Mw=380 g/mol, epoxy equivalent weight EEW=182-192) was injected into the melt zone to melt blend with solid epoxy and dispersant before entering the emulsification zone. The initial aqueous stream (IA) was then metered into the emulsification zone, and the melt polymer blend was then emulsified in the presence of water in the extruder. A co-dispersant E-SPERSE 100 (PEO (14) di- and tristyrenated Phenol ammonium sulfate (Ethox Chemicals, LLC Greenville, S.C.)) can be injected into the emulsification zone together with IA. The emulsion phase was then conveyed forward to the dilution and cooling zone of the extruder where additional water was added to form the aqueous dispersions having solid level levels of less than 60 weight percent. The properties of each of the dispersion components were measured, and are reported in Table 1. The initial water and liquid co-dispersants like E-SPERSE 100, and dilution water were all supplied by ISCO dual syringe pumps (500 ml). The barrel temperature of the extruder was set to 100° C. After the dispersion exited the extruder, it was further cooled and filtered via a 200 μm mesh size filter.

TABLE 1

Epoxy Blend Dispersions (all parts by weight)

| Epoxy Dispersion* | Epoxy or blend | Epoxy Tg (°C.) | Dispersant | Co-dispersant | Solid wt. % in dispersion | $V_{mean}$ (μm) |
|---|---|---|---|---|---|---|
| A | D.E.R. 661 (100 part) | 40 | Mowiol ™ 488 (10 part) | None | 39.18 | 0.323 |
| B | DER667E/DER331 (3:2) (101 part) | 22 | Mowiol ™ 488 (6.2 part) | E-Sperse 100 (2 part) | 56.94 | 0.443 |
| C | DER669E/DER331 (1:1) (101 part) | 15 | Mowiol ™ 488 (6.2 part) | E-Sperse 100 (2 part) | 44.97 | 0.351 |
| D | DER669E/DER331 (1:2) (100 part) | 5 | Mowiol ™ 488 (10 part) | None | 45.7 | 0.218 |

*Dispersions A and D were prepared by batch dispersion process; dispersions B and C were prepared by continuous dispersion process.

Particle Size Analysis ($V_{mean}$, Volume-Average Particle Size) for Polymer Dispersions and Redispersions of the RDP Samples:

An epoxy multilayer polymer particle dispersion sample was diluted in de-ionized (DI) water prior to analysis to avoid saturating the detector. Epoxy RDP was dispersed into DI water at 1% solid (at pH=7) and vortexed for 30 seconds twice. In addition, in order to measure the particle size in alkaline condition, 2-3 drops of 1 M NaOH solution was added into the redispersion to raise the pH to >10. Particle size was measured on Beckman Coulter LS 13 320 Laser Light Diffraction Particle Size analyzer (Beckman Coulter, Inc. Brea, Calif.), using an epoxy resin model predetermined by the instrument software. Solid content analysis was performed on an Ohaus MB45 moisture analyzer (Ohaus Corporation, Parsippany, N.J.).

Example 3: Seeded Emulsion Polymerization of Alkali Soluble Polymer Dispersions E, F, G, H, I, J, N and P (Chain Transfer Agent Mixed with Acrylic Monomers for Polymerization)

Procedure A:

Using dispersion E in Table 2, below, as an example, into a round bottom flask was added 113.4 g of the diluted epoxy dispersion A in Table 1 prepared by a batch dispersion process (solid content=40.0 wt. %) and purge with nitrogen gas while maintaining at 60° C. While stirring, 10 mg of ferrous sulfate as 1 wt. % aqueous solution was added into the dispersion. Also, 6.60 grams of methyl methacrylate and 1.65 grams of methacrylic acid were mixed and injected into the reactor over 60 min. At the same time, 2.5 g of a 2.5 wt % aqueous solution of tert-butyl peroxide, and, separately, 2.5 g of 2.5 wt % aqueous solution of sodium hydroxymethanesulfinate (total 0.75 wt. % of each component relative to acrylic monomer weight) were fed into the reactor as free radical initiators over 90 min. The reaction was maintained at 60° C. for 90 min and then allowed to cool to 25° C. and filtered through a 190 μm filter. The dispersion was isolated and analyzed: 40.43% Solids; 340 nm particle size.

Dispersion F was made from dispersion D in Table 1, above, in the same way as Dispersion E (Procedure A, above), except 13.2 grams of methyl methacrylate, 3.30 grams of methacrylic acid, 2.5 g of a 5.0 wt % aqueous solution of tert-butyl peroxide, and, separately, 2.5 g of 5.0 wt. % aqueous solution of sodium hydroxymethanesulfinate (total 0.75 wt. % of each component relative to acrylic monomer weight) were used.

Dispersion G was made from dispersion B in Table 1, above, in the same way as Dispersion E (Procedure A, above), except 8.39 grams of methyl methacrylate, 2.10 grams of methacrylic acid, 2.5 g of a 3.15 wt. % aqueous solution of tert-butyl peroxide, and, separately, 2.5 g of 3.15 wt. % aqueous solution of sodium hydroxymethanesulfinate (total 0.75 wt. % of each component relative to acrylic monomer weight) were used.

Dispersion H was made from dispersion B in Table 1, above, in the same way as Dispersion E (Procedure A, above), except 8.39 grams of methyl methacrylate, 2.10 grams of methacrylic acid, 0.105 gram of n-dodecyl mercaptan, 2.5 g of a 3.15 wt % aqueous solution of tert-butyl peroxide, and, separately, 2.5 g of 3.15 wt % aqueous solution of sodium hydroxymethanesulfinate (total 0.75 wt. % of each component relative to acrylic monomer weight) were used.

Dispersion I was made from dispersion B in Table 1, above, in the same way as Dispersion E (Procedure A, above), except 8.39 grams of methyl methacrylate, 2.10 grams of methacrylic acid, 0.210 gram of n-dodecyl mercaptan, 2.5 g of a 3.15 wt % aqueous solution of tert-butyl peroxide, and, separately, 2.5 g of 3.15 wt % aqueous solution of sodium hydroxymethanesulfinate (total 0.75 wt. % of each component relative to acrylic monomer weight) were used.

Dispersion J was made from dispersion B in Table 1, above, in the same way as Dispersion E (Procedure A, above), except 8.39 grams of methyl methacrylate, 2.10 grams of methacrylic acid, 0.210 gram of methyl 3-mercaptopropionate, 2.5 g of a 3.15 wt % aqueous solution of tert-butyl peroxide, and, separately, 2.5 g of 3.15 wt % aqueous solution of sodium hydroxymethanesulfinate (total 0.75 wt. % of each component relative to acrylic monomer weight) were used.

Dispersion N was made from dispersion C in Table 1, above, in the same way as Dispersion E (Procedure A, above), except 16.78 grams of methyl methacrylate, 4.20 grams of methacrylic acid, 2.5 g of a 6.3 wt % aqueous solution of tert-butyl peroxide, and, separately, 2.5 g of 6.3 wt % aqueous solution of sodium hydroxymethanesulfinate (total 0.75 wt. % of each component relative to acrylic monomer weight) were used.

Dispersion P was made from dispersion C in Table 1, above, in the same way as Dispersion E (Procedure A, above), except 9.06 grams of methyl methacrylate, 3.52 grams of methacrylic acid, 0.503 gram of n-dodecyl mercaptan, 2.5 g of a 3.77 wt % aqueous solution of tert-butyl peroxide, and, separately, 2.5 g of 3.77 wt % aqueous solution of sodium hydroxymethanesulfinate (total 0.75 wt. % of each component relative to acrylic monomer weight) were used.

Example 4: Seeded Emulsion Polymerization of Alkali Soluble Polymer Dispersions K, L, M, O and Q with an Epoxy Seed Dispersion and Emulsion Polymerization of Acrylic Alkali Soluble Polymer Dispersions R and S Procedure B:

Using hybrid dispersion L in Table 2, below, as an example. At ambient temperature (23° C.), 200 g of an aqueous epoxy dispersion (dispersion C in Table 1, above) and 25 g of DI water were added to a 500 mL, 4-neck round bottom flask equipped with a mechanical stirrer, thermocouple, condenser and a stainless steel dip tube, stirred at 125 rpms, and warmed. The monomer emulsion (ME) indicated in Table 1A was prepared by adding the ingredient listed below by mixing for 10 minutes with a stir bar. When the reactor contents reached 60° C., the promoter solution from Table 1A, below was added quickly in one addition to the reactor followed by the addition of the ME, cofeed initiator and activator solutions (as in Table 1A, below) using Cole-Palmer Dual syringe pumps (Model 200) (from Cole-Parmar Instrument Company, Vernon Hills, Ill.). The ME was feed at 1.73 gm/min (total feed time 30 min). Both of the cofeed solutions were feed at 0.34 gm/min (total feed time 45 min). The temperature of the emulsion was maintained between 59-61° C. The emulsion was continuously stirred with a peak agitation of 300 rpms.

TABLE 1A

Alkali Soluble Polymer Composition for Emulsion Polymerization to make Dispersion L

|  | Wt (gm) |
|---|---|
| Monomer Emulsion (ME) | |
| DI Water | 11.5 |
| Sodium Dodecylbenzene Sulfonate | 0.14 |
| Methyl Methacrylate (MMA) | 30.49 |
| Allyl Methacrylate | 0.59 |
| Methacrylic Acid (MAA) | 7.77 |
| n-Dodecyl Mercaptan (NDDM) | 1.48 |
| Cofeed Initiator | |
| t-Butyl Hydroperoxide (70%) | 0.41 |
| DI Water | 15 |
| Co-feed Activator | |
| Sodium Formaldehyde Sulfoxylate | 0.27 |
| DI Water | 15 |
| Promoter | |
| Iron (II) Sulfate Heptahydrate | 0.002 |
| DI Water | 5 |
| Chase Initiator | |
| t-Butyl Hydroperoxide (70%) | 0.05 |
| DI Water | 5 |
| Chase Activator | |
| Sodium Formaldehyde Sulfoxylate | 0.05 |
| DI Water | 5 |

After the feeds in Table 1A, above, were completed, both the chase initiator and activator solutions were sequentially added to the reactor in one quick addition. The reactor contents were then maintained at 60° C. for 15 minutes. After this time, the reactor contents were cooled to ambient temperature (<30° C.). The latex was isolated and analyzed: 40.43% Solids; 414 nm particle size, 75 ppm MMA and pH 3.51.

Dispersion K was made from dispersion C in Table 1, above, in the same way as Dispersion L (Procedure B and Table 1A, above), except using 66.7 wt. % of each the feeds listed in Table 1A, above, based on the weight of each respective feed in Table 1A.

Dispersion M was made from dispersion C in Table 1, above, in the same way as Dispersion L (Procedure B and Table 1A, above), except using 166.7 wt. % of each of the feeds listed in Table 1A, above, based on the weight of each respective feed in Table 1A.

Dispersion O was made from dispersion C in Table 1, above, in the same way as Dispersion L (Procedure B and Table 1A, above), except using 32.52 grams of MMA and 5.74 grams of MAA.

Dispersion Q was made from dispersion C in Table 1, above, in the same way as Dispersion L (Procedure B and Table 1A, above), except replacing MAA with acrylic acid (AA).

Dispersion R was made in the same way as Dispersion L (Procedure B and Table 1A, above), except replacing the seed epoxy dispersion with 5.11 grams of Mowiol™ 488 and 2.75 grams of E-Sperse 100 (60% active).

Dispersion S was made in the same way as Dispersion L (Procedure B and Table 1A, above), except replacing the seed epoxy dispersion with 5.11 grams of Mowiol™ 488 and 2.75 grams of E-Sperse 100 (60% active) and without adding nDDM.

The effect of chain transfer agent on the molecular weight of the alkali soluble polymeras shown in Table 3, below, on the molecular weight of the emulsion polymers of Dispersions R and S was characterized by size exclusion chromatography (SEC) based on polystyrene standards. By adding 4% nDDM, the molecular weight of the alkaline soluble polymer was significantly reduced.

| Alkali Soluble Polymer | Composition | % Solids | Particle Size | pH | Mn |
|---|---|---|---|---|---|
| R | 30% ASR, 4% nDDM | 39.18% | 355 nm | 3.93 | 14.4k |
| S | 30% ASR, no nDDM | 40.43% | 414 nm | 3.51 | 36.1k |

*Alkali Soluble Resin (ASR) contains 78.5 wt. % PMMA and 20 wt. % PMAA, and 1.5 wt. % ALMA, based on the total weight of monomers used to make the resin; nDDm is n-dodecyl mercaptan.

TABLE 2

Summary of Multilayer Polymer Particle Dispersions

| Multilayer Polymer Particle Dispersion | Epoxy Dispersion | Alkali Soluble Polymer Shell (wt. parts phr epoxy) | $V_{mean}$ (nm) |
|---|---|---|---|
| E | A | PMMA-PMAA (4:1) 20 part | 340 |
| F | D | PMMA-PMAA (4:1) 40 part | 240 |
| G | B | PMMA-PMAA (4:1) 25 part | 458 |
| H | B | PMMA-PMAA (4:1) 25 part 1% nDDM | 370 |
| I | B | PMMA-PMAA (4:1) 25 part 2% nDDM | 370 |
| J | B | PMMA-PMAA (4:1) 25 part 2% MMP | 368 |
| K | C | 20% ASR 4% nDDM (MMA:MAA = 4:1) | 355 |
| L | C | 30% ASR 4% nDDM (MMA:MAA = 4:1) | 365 |
| M | C | 50% ASR 4% nDDM (MMA:MAA = 4:1) | 374 |
| N | C | 50% ASR (MMA:MAA = 4:1) | 380 |
| O | C | 30% ASR 4% nDDM (MMA:MAA = 17:3) | 368 |
| P | C | 30% ASR 4% nDDM (MMA:MAA = 18:7) | 360 |
| Q | C | 30% ASR 4% nDDM (MMA:AA = 4:1) | 368 | nDDM: n-dodecyl mercaptan;
MMP: Methyl 3-mercaptopropionate;
phr: per hundred weight parts resin solids;
In dispersions K, L, M and O, there is 1.5 wt. % ALMA in ASR shell, based on the total weight of monomers used to make the resin.

Example 4: Spray Drying to Make RDPs

A two-fluid nozzle atomizer was equipped on a MOBILE MINOR™ 2000 Model H spray dryer (GEA Niro, Denmark). The nitrogen pressure to nozzle atomizer was fixed at 1 bar with 50% flow which is equivalent to 6.0 kg/hour of air flow. A glass jar was placed under the cyclone with the valve on the bottom of the cyclone open. Each of the aqueous dispersions from Table 2, above, (35-40 wt. % solid content) was pumped into the nozzle atomizer by an emulsion feed pump (from Cole-Parmar Instrument Company, Vernon Hills, Ill.). Where indicated in Table 3, below, additional polymer stabilizer like PVOH and polyvinylpyrrolidone (PVP) was mixed into the dispersion prior to spray drying. The spray drying experiment was conducted in $N_2$ environment with an inlet temperature fixed at 140° C., and the outlet temperature was targeted at 50° C. by tuning the feed rate of the dispersion (feed rate=20-30 mL/min). Meanwhile, kaolin clay powder (KaMin™ HG-90, Kamin LLC, Macon, Ga.) was fed (feed rate=0.5-1.5 g/min) into the dryer chamber as an anti-caking agent. The multilayer polymer particle dispersion was atomized by high air pressure at the nozzle atomizer and dried inside the chamber, and the dry powder was collected in the glass jar attached on the cyclone. The resulting redispersible polymer powder has a mean particle size of 10 to 30 μm. The test results for each redispersible polymer powder are listed in Table 3, below.

The RDPs in Examples 1-17 are given in Table 3, below, along with the shelf life and redispersibility performance of each Example. The following test results were used:

Shelf Life:

Defined herein as the time when epoxy RDP remains >50% redispersed (as defined below) at room temperature. An acceptable shelf life is at least 1 month and, preferably, 3 months or longer.

Redispersibility:

The redispersibility of the RDP powders was evaluated by comparison of the particle size of the powder re-dispersed in water with the particle size of the original dispersion. The dry powder was dispersed into deionized water at 1% solid and vortexed for 30 seconds twice, and 2-3 drops of 1M NaOH solution was added to tune the pH of the redispersion to >10. The particle size of the redispersion was then measured by a Coulter LS 13 320 Laser Light Diffraction Particle Size analyzer. The redispersibility is defined as the volume percentage of particles below 1 μm in the redispersion. For instance, if the redispersion shows 20% particle below 1 μm by volume, the redispersibility of this powder is 20%.

Expected Shelf Life Based on Aging Tests:

To accelerate shelf life tests, the RDP examples were aged at 50° C. for different time periods as indicated in Table 3, below, and redispersibility was measured in an alkaline solution containing NaOH at a pH of 10-11. It is expected that 5 hours aging at 50° C. is roughly equivalent to 1 month at RT and that 12 hours of aging at 50° C. is roughly equivalent to 2 months at RT.

TABLE 3

Summary Of Spray Dried Epoxy RDPs

| RDP Ex. | Multilayer Polymer Particle Dispersion | Total Stabilizer[a] (wt. %, based on epoxy resin solids) | Redispersibility (%) after aging at 50° C. | | | | | Shelf life at RT |
|---|---|---|---|---|---|---|---|---|
| | | | 0 h | 4 h | 8 h | 12 h | 40 h | |
| 1* | E | 10% PVOH | 100 | 100 | 100 | 100 | <20 | 5 months |
| 2* | F | 10% PVOH | 100 | <20 | — | — | — | <1 week |
| 3* | G | 11.2% PVOH | 100 | <20 | — | — | — | <1 week |
| 4 | G | 6.2% PVOH + 5% PVP | 100 | >90 | >80 | >50 | — | 2 month |
| 5* | G | 6.2% PVOH + 5% PAM | 100 | <20 | — | — | — | <1 weeks |
| 6* | G | 11.2% PVOH | 100 | <20 | — | — | — | <1 week |
| 7* | H | 11.2% PVOH | 100 | >80 | <20 | — | — | ~2 weeks |
| 8 | I | 6.2% PVOH + 5% PVP | 100 | 100 | 100 | 100 | 80 | 12 months** |

TABLE 3-continued

Summary Of Spray Dried Epoxy RDPs

| RDP Ex. | Multilayer Polymer Particle Dispersion | Total Stabilizer[a] (wt. %, based on epoxy resin solids) | Redispersibility (%) after aging at 50° C. | | | | | Shelf life at RT |
|---|---|---|---|---|---|---|---|---|
| | | | 0 h | 4 h | 8 h | 12 h | 40 h | |
| 9 | I | 11.2% PVOH | 100 | 100 | 100 | 100 | 20 | 6 months |
| 10* | J | 11.2% PVOH | 100 | ~50 | <20 | — | — | 1 month |
| 11* | K | 6.2% PVOH + 6% PVP | 100 | <20 | — | — | — | <1 week |
| 12 | L | 6.2% PVOH + 6% PVP | 100 | 50 | 38 | — | — | 1 month |
| 13 | M | 6.2% PVOH + 6% PVP | 100 | 100 | 100 | <30 | — | 2 months |
| 14 | N | 6.2% PVOH + 6% PVP | 100 | 100 | 100 | 100 | <30 | 4 months** |
| 15* | O | 6.2% PVOH + 6% PVP | 100 | <20 | — | — | — | <1 week |
| 16 | P | 6.2% PVOH + 6% PVP | 100 | 100 | 100 | 100 | 15 | 4 Months** |
| 17* | Q | 6.2% PVOH + 6% PVP | 26 | <20 | — | — | — | <1 week |

*Comparative Example;
**Expected shelf life based on aging tests;
[a]Total stabilizer includes PVOH in the seed epoxy dispersions and additional PVOH or PVP added after polymerization; PVP = polyvinylpyrrolidone (Mw = 40 kg/mol, Sigma-Aldrich, St. Louis, MO); PVOH = Mowiol™ 488; PAM = polyacrylamide (Mn = 10 kg/mol, Sigma-Aldrich).

The RDP in Comparative Example 1 in Table 3, above, remained redispersible for storage at room temperature for 5 months with a higher Tg epoxy (40° C.). However low $T_g$ epoxy RDPs in Comparative Examples 2 and 3 exhibited less than 1 week shelf stability. It is expected that lower Tg epoxy RDPs will have reduced shelf lives.

In Example 9, a low Tg epoxy (Tg=15° C.) multilayer polymer particle RDP exhibited very good shelf life because a hydrophic chain transfer agent was included in the alkali soluble polymer. In contrast, in Comparative Example 10 the same polymer with a hydrophilic chain transfer agent did not give acceptable shelf life.

With a low $T_g$ epoxy (Tg=15° C.) multilayer polymer particle RDP, having 6 wt. % of copolymerized methacrylic acid (30% alkali soluble polymer shell at MMA:MAA=4:1, 4% nDDM) and 6% PVP as a colloidal stabilizer, the RDP Example 12 in Table 3, above, gave a passable 1 month shelf life. However, when the copolymerized methacrylic acid level in the multilayer polymer particle drops below 5 wt. % of the alkali soluble polymer (30% alkali soluble polymer shell with 15% copolymerized acid), the RDP of Comparative Example 15 exhibited <1 week shelf life even with 6% PVP. See also Comparative Example 11. In contrast, the same polymer with 8.4 wt. % copolymerized methacrylic acid (28% acid in alkali soluble polymer present at 30 wt. % of the RDP) in Example 16 has approximately 4 months shelf life. With even more (10 wt. %) copolymerized methacrylic acid (50% alkali soluble polymer with 20% copolymerized methacrylic acid) and a PVP colloidal stabilizer in Example 14, low Tg epoxy multilayer polymer particle RDP gave 2 months shelf life even without a hydrophobic chain transfer agent.

With a slightly higher Tg (22° C.) soft epoxy resin, as shown in Table 3, above, including the hydrophobic chain transfer agent even at 2 wt. % in the multilayer polymer particle RDP of the present invention greatly increases shelf life, as shown in Example 9 with 2% copolymerized nDDM and 6 months shelf life. In Example 8, including some poly(vinylpyrrolidinone) colloidal stabilizer in the same polymer RDP increased shelf life to 12 months.

The effect of the colloidal stabilizer is particularly evident in Example 4 (epoxy Tg=22° C.) wherein a small amount of poly(vinylpyrrolidinone) colloidal stabilizer in the same polymer RDP increased shelf life to 2 months from less than one week with any other colloidal stabilizer in Comparative Examples 3, 5 and 6.

We claim:

1. A redispersible polymer powder composition comprising as powder or an aqueous dispersion multilayer polymer particles of from 50 to 90 wt. % of epoxy resin compositions having a calculated glass transition temperature (Tg) of from 0 to 40° C., and from 10 to 50 wt. %, of an alkali soluble polymer shell around the epoxy resin, which polymer shell is the copolymerized product of from 10 to 50 wt. % of methacrylic acid or its anhydride, based on total weight of monomers copolymerized to form the alkali soluble polymer shell, and the remainder of one or more ethylenically unsaturated comonomer and, if included, one or more chain transfer agent, wherein in the redispersible polymer powder, (i) the alkali soluble polymer comprises in copolymerized form from 0.1 to 10 wt. %, based on total weight of monomers copolymerized to form the alkali soluble polymer shell plus chain transfer agents, of one or more hydrophobic chain transfer agent, (ii) the redispersible polymer powder comprises from 3 to 25 wt. % based on the total weight of epoxy resin, alkali soluble polymer and colloidal stabilizer solids, of one or of a mixture of colloidal stabilizers having a Tg of 90° C. or more, or (iii) both (i) and (ii).

2. The redispersible polymer powder composition as claimed in claim 1, wherein the calculated Tg of the epoxy resin composition is from 5 to 35° C.

3. The redispersible polymer powder composition as claimed in claim 1, wherein the epoxy resin composition is a blend of two or more epoxy resins.

4. The redispersible polymer powder composition as claimed in claim 1, wherein the alkali soluble polymer that comprises the polymer shell of the multilayer polymer particle has a calculated Tg of 60 to 120° C.

5. The redispersible polymer powder composition as claimed in claim 1, wherein the alkali soluble polymer shell is the copolymerized product of from 20 to 50 wt. % of methacrylic acid or its anhydride, based on total weight of monomers copolymerized to form the alkali soluble polymer.

6. The redispersible polymer powder composition as claimed in claim 1, wherein the chain transfer agent comprises N-dodecyl mercaptan.

7. The redispersible polymer powder composition as claimed in claim 1, wherein the colloidal stabilizer is chosen from poly(vinyl pyrrolidone) or a copolymer thereof.

8. A composition comprising cement or hydraulic binder and the redispersible polymer powder composition as claimed in claim 1.

9. A method for making a water dispersible epoxy multilayer polymer powder comprising:
mechanically dispersing an epoxy resin in an aqueous medium to form an initial aqueous epoxy resin dispersion;
charging the initial aqueous epoxy resin dispersion into a reaction vessel;
providing in the reaction vessel an ethylenically unsaturated monomer mixture comprising (i) from 10 to 50 wt. % of methacrylic acid or its anhydride, and (ii) the remainder of one or more copolymerizable ethylenically unsaturated monomers, each based on the total weight of ethylenically unsaturated monomers copolymerized to form a polymer shell;
copolymerizing the monomer mixture in the presence of the initial aqueous epoxy resin dispersion to form an aqueous multilayer polymer particle dispersion;
adding one or more colloidal stabilizer to the aqueous multilayer polymer particle dispersion; and,
removing the aqueous phase from the resulting multilayer polymer to obtain a water redispersible epoxy polymer powder having an alkali soluble polymer shell,
wherein the resulting water redispersible epoxy multilayer polymer powder has from 50 to 90 wt. % of epoxy resin compositions, based on total multilayer polymer particle solids, and,
further wherein, the resulting epoxy multilayer polymer powder comprises (i) one or a mixture of colloidal stabilizers having a Tg of 90° C. or more, (ii) from 0.1 to 10 wt. %, based the total weight of ethylenically unsaturated monomers copolymerized to form the polymer shell, of a hydrophobic chain transfer agent in copolymerized form, or both (i) and (ii).

10. The process as claimed in claim 9, wherein the providing the monomer mixture comprises adding the ethylenically unsaturated monomer mixture by gradual addition to the reaction vessel containing the initial aqueous epoxy resin dispersion.

* * * * *